United States Patent
Tung et al.

(10) Patent No.: US 6,685,357 B1
(45) Date of Patent: Feb. 3, 2004

(54) TRANSMISSION SHAFT SET

(75) Inventors: Chao-Nien Tung, Hsinchu (TW); Shih-Jen Lin, Taipei (TW); Kuo-Chu Hsieh, Taoyuan (TW); Yi-Da Chiu, Taichung (TW)

(73) Assignees: Newcera Technology Co., Ltd., Hsinchu (TW); New Century Technology Co., Ltd., Hsinchu (TW)

( * ) Notice: Subject to any disclaimer, the term of this patent is extended or adjusted under 35 U.S.C. 154(b) by 4 days.

(21) Appl. No.: 10/225,182

(22) Filed: Aug. 22, 2002

(51) Int. Cl.[7] ............................................. F16C 19/52
(52) U.S. Cl. ....................... 384/278; 384/913
(58) Field of Search ................. 384/129, 278, 384/279, 276, 280, 913

(56) References Cited

U.S. PATENT DOCUMENTS

| | | | | |
|---|---|---|---|---|
| 4,231,623 A | * | 11/1980 | Kaufman | 384/429 |
| 4,889,494 A | * | 12/1989 | Kunz | 384/246 |
| 5,346,316 A | * | 9/1994 | Okada et al. | 384/297 |

* cited by examiner

*Primary Examiner*—Lenard A. Footland
(74) *Attorney, Agent, or Firm*—Rabin & Berdo, P.C.

(57) ABSTRACT

A transmission shaft set includes a shaft for use in a motor for power output and an axle bush adapted to support the shaft, the shaft and the axle bush being respectively made of material of high toughness and material of high harness such that the hardness difference between the shaft and the axle bush is about Hv100~Hv400, and the hardness of the axle bush is higher than the shaft.

5 Claims, 2 Drawing Sheets

TRANSMISSION SHAFT SET

BACKGROUND OF THE INVENTION

1. Field of the Invention

The present invention relates to a transmission shaft set and, more particularly, to a transmission shaft set having the properties of high toughness and high friction resisting power that produces low noise, dissipates heat. The shaft and axle bush of the transmission set are respectively made of zirconia-modified material of high toughness and zirconia-modified material of high hardness to achieve a long service life.

2. Description of the Related Art

The transmission shaft set of a regular fan is generally comprised of a high lubricating bronze axle bush and a stainless steel shaft. The porous structure of a bronze axle bush effectively holds grease, providing a satisfactory lubricating function. However, due to high heat expansion coefficient (4~5 times over ceramics), a bronze axle bush deforms quickly when operated at a high speed. Further, because of low hardness (below Hv500), a bronze axle bush wears quickly with use. The service life of a bronze axle bush is about 10000 hours. When a ball bearing is used in a transmission shaft set to support the shaft instead of an axle bush, the service life of the transmission shaft set can be prolonged to about 50000~60000 hours, however it produces vibration and high noise during operation. Recently, precision ceramic materials have been intensively used for making ball bearings or axle bushes instead of bronze. A precision ceramic ball bearing or axle bush does not deform easily when hot, however it is not suitable for high speed or high torque application.

SUMMARY OF THE INVENTION

The present invention has been accomplished to provide a transmission shaft set, which eliminates the aforesaid drawbacks. It is therefore the main object of the present invention to provide a transmission shaft set, which produces low noise and low friction resistance during operation. It is another object of the present invention to provide a transmission shaft set, which dissipates heat quickly during operation. It is still another object of the present invention to provide a transmission shaft set, which does not expand easily when hot. It is still another object of the present invention to provide a transmission shaft set, which is practical for high speed and high torque application. To achieve these and other objects and according to one aspect of the present invention, the shaft and the axle bush of the transmission shaft set are respectively made of material of high toughness and material of high harness such that the hardness difference between the shaft and the axle bush is about Hv100~Hv400, and the hardness of the axle bush is higher than the shaft. According to another aspect of the present invention, a lubricant is applied to the gap in the contact area between the shaft and the axle bush to minimize operating noise.

DETAILED DESCRIPTION OF THE PREFERRED EMBODIMENT

Figure 1:
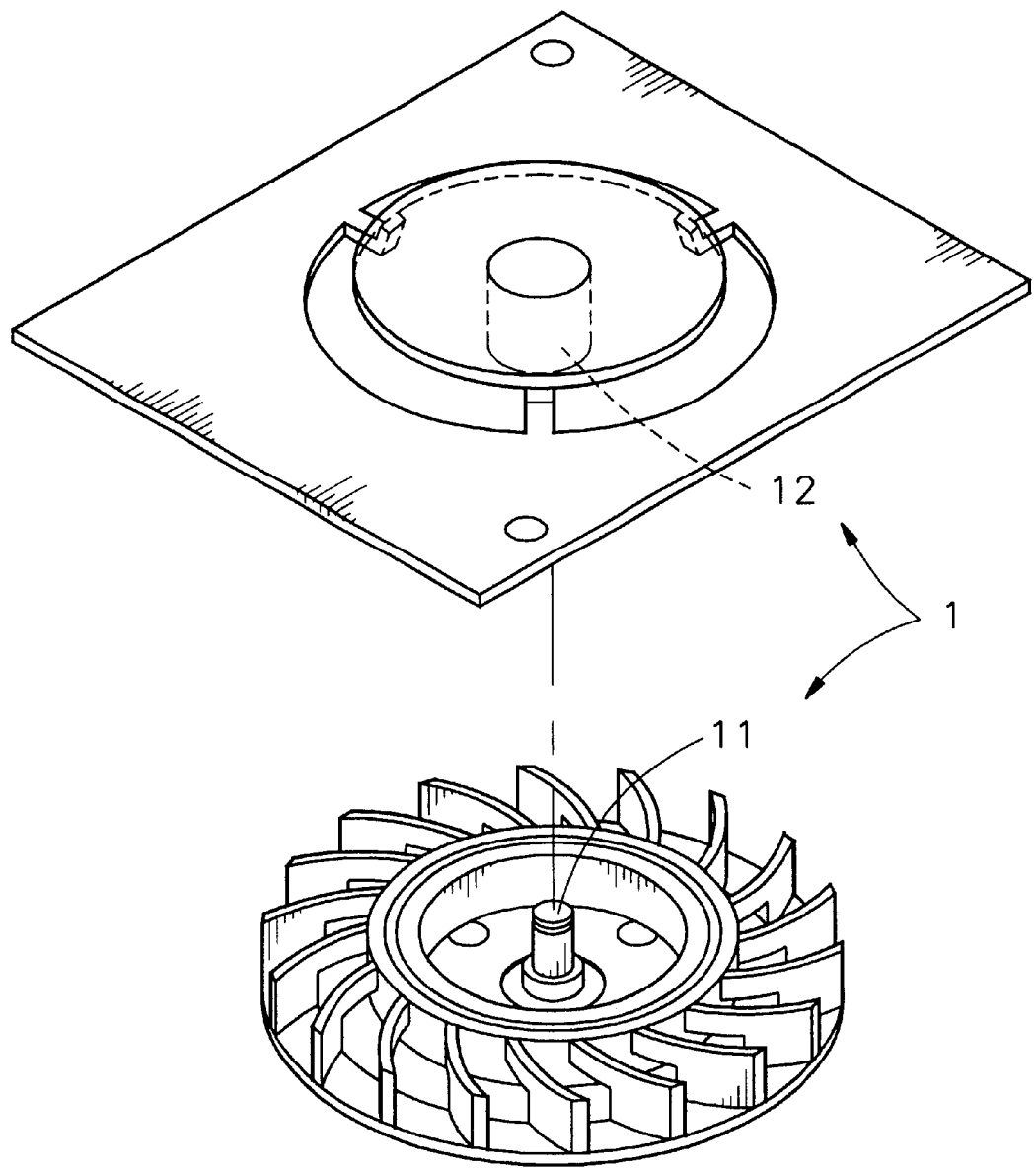
FIG. 1 is an exploded view of the preferred embodiment of the present invention.
Figure 2:
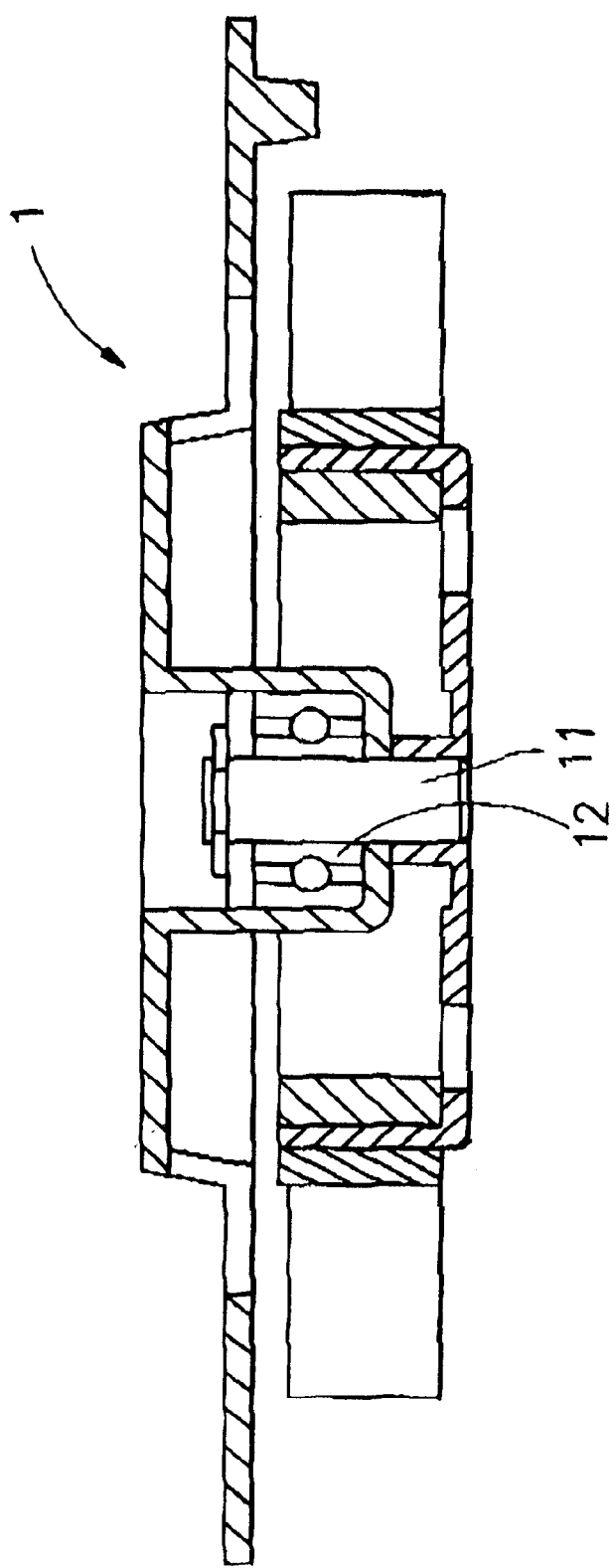
FIG. 2 is a side view in section of the preferred embodiment of the present invention.

Referring to FIGS. 1 and 2, a transmission shaft set is shown comprising a shaft 11 installed in a fan 1, and an axle bush 12 supporting the shaft 11. The shaft 11 is made of material of high toughness (for example, surface hardened stainless steel material, material containing $YNbO_4$, YSZ (yttrium stabilized zirconia) containing 3% mole~8% mole $Y_2O_3$, zirconia modified ceramics), sintered with YSZ containing 0.2%wt~20%wt aluminum oxide into relative theoretical density 98%. The grain dimension of the sintered material is smaller than 0.5 $\mu$m. The mechanical hardness of the axle bush 12 is determined subject to the hardness of the shaft 11. The axle bush 12 is made of hard material about Hv100~Hv400 harder than the shaft 11. In case the hardness difference between the shaft 11 and the axle bush 12 is insignificant, the shaft 11 is of low toughness and suitable for low speed and low torque output application only. In case the hardness of the shaft 11 surpasses the axle bush 12, the shaft 11 will wear quickly with use.

EXAMPLE I

Heat-treated reinforced stainless steel is used for the shaft 11 (hardness about Hv700~Hv800), having tensile strength over 56 kgf/mm$^2$. The axle bush 12 is made of YSZ compound ceramics containing aluminum oxide 0.2 wt %~1.5 wt % and $Y_2O_3$ 3~8 mole %, and sintered at 1350~1400° C. to hardness about Hv900~Hv1200.

EXAMPLE II

Yttrium stabilized zirconia containing $YnbO_4$ of Hv about 900~1100 is used for the shaft 11. The axle bush 12 is made of YSZ compound ceramics containing aluminum oxide 1.5 wt %~2 wt % and sintered to over Hv1300.

A transmission shaft set made according to either of the aforesaid two examples has the features of high toughness and high hardness, achieving the following advantages:

1. The arrangement of the aforesaid first example is suitable for high torque output and high-speed application. The hardness arrangement is Hv800 for the shaft 11 and Hv1200 for the axle bush 12. The service life of this arrangement can be as long as 300000 hours at the maximum speed of 10000 rpm. The arrangement of the aforesaid second example is suitable for a low speed and long service life application, i.e., the arrangement of the aforesaid second example can work over 600000 hours.
2. The transmission shaft set of the shaft 11 and axle bush 12 produces low noise when operated. In comparison with prior art designs of similar capacity, the aforesaid first and second examples reduce operating noise at least by about 2~5 dB.
3. The total weight of the shaft 11 and the axle bush 12 is low. Because low specific gravity material of high toughness is used instead of high specific gravity material, the total weight is reduced by about ¼~½.
4. There is a low heat expansion effect between the shaft 11 and the axle bush 12, providing high operating stability and maintaining high accuracy.
5. A lubricant is filled in minor gap between the shaft 11 and the axle bush 12 to effectively buffer and lubricate the contact area between the shaft 11 and the axle bush 12, therefore friction resistance is minimized, achieving high operating stability.

In general, the material matching concept employed to the transmission shaft 11 of the fan 1 and the axle bush 12 effectively eliminate the drawbacks of low strength and short service life as seen in prior art designs, and enables the transmission shaft set to operate at a high speed for a long time.

Subject to the description for the aforesaid first and second examples, the invention as be defined as follows:

(1) A material of high toughness and a material of high hardness are respectively used for the shaft 11 and the axle bush 12 to achieve the transmission shaft set design.
(2) Under the scope defined in item (1), the hardness difference between the shaft 11 and the axle bush 12 is about HV100~Hv400, and the hardness of the axle bush 12 is higher than the shaft 11.
(3) The material of high toughness for the shaft 11 as defined in item (1) can be surface modified stainless steel of tensile strength over 56 kgf/mm2, or yttrium stabilized zirconia of bending strength over 500 Mpa containing $Y_2O_3$ 3~8 mole %, $YNbO_4$ below 5 mole %, and aluminum oxide below 1.5 wt %.
(4) The material of high harness for the axle bush 12 as defined in item (1) can be aluminum oxide added yttrium stabilized zirconia containing aluminum oxide 0.25~20 wt %, or any equivalent material of harness over Hv100~Hv400.

A prototype of transmission shaft set has been constructed with the features of the annexed drawings of FIGS. 1~2. The transmission shaft set functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A transmission shaft set for use in a motor for power output, comprising:

a shaft with one end attached to a fan, and;
    an axle bush adapted to support another end of said shaft, wherein said shaft is made of a first material and said axle bush is made of a second material, such that a hardness difference between said first material and said second material is in a range of Hv100~Hv400, and wherein the hardness of said second material is higher than said first material.

2. The transmission shaft set as claimed in claim 1, wherein said first material for said shaft is comprised of stainless steel having a tensile strength over 56 kgf/mm$^2$.

3. The transmission shaft set as claimed in claim 1, wherein said first material for said shaft is comprised of enhanced yttrium stabilized zirconia of bending strength over 500 Mpa containing $Y_2O_3$ 3~8 mole %, $YNbO_4$ below 5 mole %, and aluminum oxide below 1.5 wt %.

4. The transmission shaft set as claimed in claim 1, wherein said second material for said axle bush is comprised of aluminum oxide added yttrium stabilized zirconia containing aluminum oxide 0.25~20 wt %.

5. The transmission shaft set as claimed in claim 1, further comprising a lubricant in a contact area between said shaft and said axle bush.

* * * * *